(No Model.)
W. B. HEYWOOD.
AUTOMATIC OFFSET MECHANISM FOR SAWMILL CARRIAGES.
No. 600,225. Patented Mar. 8, 1898.
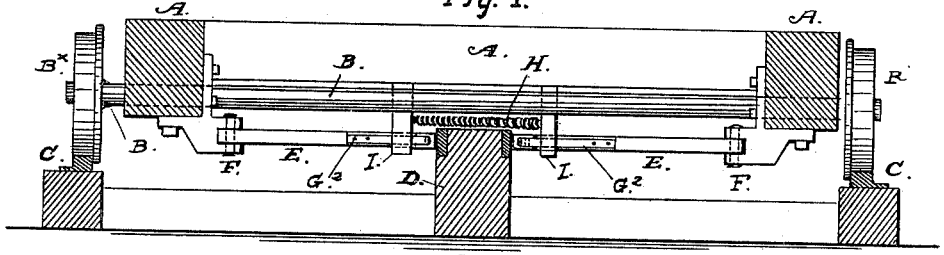
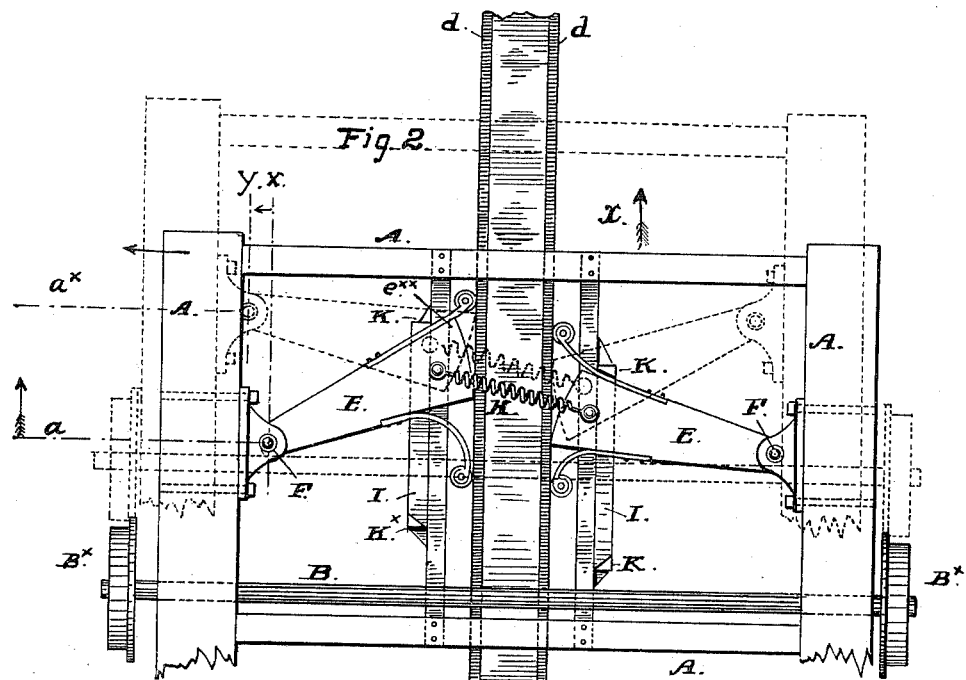
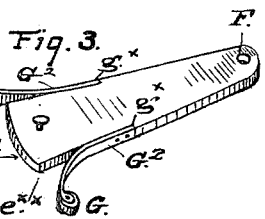
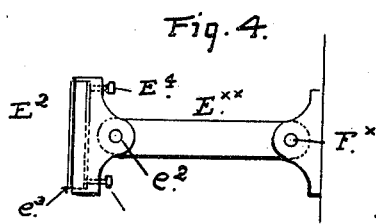
Witnesses:
E. Salomon
M. Regner
Inventor:
William B. Heywood,
By Smith & Osborn
his Attys.

UNITED STATES PATENT OFFICE.

WILLIAM B. HEYWOOD, OF BERKELEY, CALIFORNIA.

AUTOMATIC OFFSET MECHANISM FOR SAWMILL-CARRIAGES.

SPECIFICATION forming part of Letters Patent No. 600,225, dated March 8, 1898.

Application filed November 5, 1897. Serial No. 657,534. (No model.)

*To all whom it may concern:*

Be it known that I, WILLIAM B. HEYWOOD, a citizen of the United States, residing at Berkeley, in the county of Alameda and State of California, have invented certain new and useful Improvements in Automatic Offset Mechanism for Sawmill-Carriages, of which the following is a specification.

This invention relates to improvements made in "offset" mechanism for the carriages of sawmills; and it has for its object the production of an offset device or mechanism that will operate automatically at the end of the forward run of the carriage, and also at the end of the "feeding back" the carriage begins to move forward at whatever point in the full row of the carriages these movements are caused to take place. This present mechanism differs from similar mechanism in being mounted entirely on the carriage and being operated directly by the change in the direction of the movement of the carriage both at the end of the feeding forward and at the end of the feeding back, whereby it produces the desired lateral movement or offset at the end of a run of any length, thus being adapted for logs that vary considerably in length and enabling both long and short logs to be fed and cut on the same carriage.

To such end and object my said invention consists in certain novel parts and combination of parts, as hereinafter more fully described, and pointed out in the claims at the end of this specification, reference being had therein to the accompanying drawings.

In the said drawings, Figure 1 is an elevation in transverse section of the front end portion of a sawmill-carriage and its track with my automatic mechanism applied to it. Fig. 2 is a plan or top view of Fig. 1. Fig. 3 is a detail view of one of the dogs or levers that engage the fixed center rail. Fig. 4 represents a slight modification in which the end of the lever working against the center rail is fitted with a pivoted shoe.

The carriage-feeding mechanism and the knees or head-blocks and the necessary means for clamping and feeding up the log to the saw to cut the required thickness of boards are omitted from the figures of the drawings for the reason that the same form no material part of this invention, and being already well understood by those familiar with the construction and operation of sawmills a detailed description of the same is not considered necessary.

A A indicate the frame of the carriage.

B is the forward axle, and $B^\times B^\times$ are the wheels.

C C are the rails on which the carriage travels. The side tumblers are capable of a limited lateral movement on the axles, so that while the trucks are traveling on the rails the carriage can be shifted over to one side or the other. In the present construction shown and described the carriage is arranged to move laterally the distance of one inch in either direction, which is ordinarily a sufficient offset to clear the log from the saw for the backward run.

D is a stationary central rail set in the center of the track and having vertical faces $d\ d$ extending parallel with the carriage-rails the distance of the run of the carriage.

E is a dog or lever pivotally attached to the carriage-frame at F and provided with a broad curved face E' on the outer end. One end $e^\times$ of each curved face is nearer the pivot F than the opposite end $e^{\times\times}$, and the difference in the length of one side of the dog over the other is equal to the length of lateral movement required for the carriage. The curve approaches in shape the segment of an ellipse or is of suitable shape to produce a rolling contact with the side of the fixed rail D, against which such end of the lever is held. There is one of these levers on each side of the center of the carriage, and the two are held in working contact with the fixed rail by a spiral spring H and with a sufficient grip or pressure to produce an angular movement in one or the other under the longitudinal movement of the carriage.

G G' are smooth rim-wheels or small rollers mounted to turn loosely on bearings on the ends of stiff spring-arms $G^2$, and by such arms held with pressure against the sides of the center rail in certain positions of the levers E. The springs $G^2$ are fastened at one end $g^\times$ to the lever, and the rollers are mounted on the free outer ends. The function of these rollers is to take the pressure of the lever from the fixed rail at the two corners of the working end $e'$ when either the point $e^x$ or the point $e^{xx}$ is in contact with the face of the rail, and by that means to reduce the bite or grip to an extent or degree sufficient to reduce the friction and prevent the wear of the rail and the face of the dog.

I is a strap secured to the cross-timbers of the carriage-frame and extending under the lever to support the outer end of that part, and K $K^x$ are two stops also on the frame of the carriage, one located in front of the lever and the other in the rear of it. These two stops regulate the length of movement of the lever on its center F in the motion of the carriage.

As thus constructed and combined the operation of these parts is as follows: At the beginning of the forward movement of the carriage to feed the log to the saw one of the dogs or levers stands with its longer side substantially at right angles to the center rail and its point $e^{xx}$ in contact with the rail, while the dog on the opposite side stands in an angular position with the shorter side $e^x$ in contact with the center rail and its longer side $e^{xx}$ clear of it. The two dogs are brought into these positions by the previous backward movement of the carriage and are thus ready to act as soon as the feeding movement is stopped and the carriage begins to start forward, whatever may be the length of the feeding back. Such position of the parts of the mechanism are represented in Fig. 2 of the drawings, in which the carriage having reached the end of the backward movement is about to move forward in the direction of the arrow X. As soon as the carriage starts to travel in this direction the pivotal points F of the dogs are carried forward on longitudinal lines parallel with the center rail, and as the pivot of the left-hand dog advances from $a$ to $a^x$, Fig. 2, the curved end of the dog bearing against the center rail holds that end back by frictional contact, in consequence of which the longer side $e^{xx}$ of the dog is brought to the perpendicular or about at right angles to the center rail. This movement has the effect to move the point F laterally from $x$ to $y$, and thus shift the carriage on its axles a corresponding distance at the same time that the opposite dog is thrown into an angular position to a corresponding extent or amount by the forward movement of the pivotal point F and the restoration of the outer end of the dog, due to its contact with the center rail.

The last-mentioned position of the dogs is indicated in Fig. 2 by the dotted lines, and theoretically the parts are brought to that position and the carriage shifted on the trucks at the beginning of the return movement of the carriage either forward or backward and within the distance of six to eight inches in the length of travel; but practically this is somewhat greater, owing to a certain amount of slip or sliding movement of the end of the dog upon the rail, which is greater or less according to the strength of the spiral spring employed and the degree of pressure allowed between the end of the dog and the rail. As the dogs E E reach the end of their angular movement and the extreme ends or points $e^x$ $e^{xx}$ of the curve come against the center rail the further movement of the dogs is prevented by the fixed stops K $K^x$ on the carriage, and being held at rest by them the dogs maintain their respective angular and perpendicular position with respect to the center rail during the remainder of the run or travel. At such times the rollers are pressed against the rail with sufficient degree of force to relieve the end of the dog from much rubbing contact with the rail, and thereby reduce as much as possible the wear of these two surfaces of contact.

In the slight modification illustrated in Fig. 4 the lever $E^{xx}$ is provided with shoes $E^2$, having flat faces, each shoe being attached to the outer end of the lever by a pivot-joint $e^2$. The face of the shoe is always in contact with the rail, being held to it by the spiral spring, and the working face is formed of a removable block $e^3$, having adjusting-screws $E^4$, by means of which the wear is taken up and the degree of pressure or frictional contact is regulated.

Having thus fully described my invention, what I claim as new, and desire to secure by Letters Patent, is—

1. The combination, with a sawmill-carriage laterally movable on its axles; of a fixed central rail between the track-rails, dogs or levers pivotally attached to the carriage-frame on opposite sides of said central rail having their free ends set to engage the central rail, the length of each dog being greater than the distance between the side of the central rail and the point of attachment of the dog to the carriage-frame, whereby the movement of the dog on its pivot from a diagonal line to a line perpendicular to the central rail shifts the carriage laterally on its axles, a coiled spring connecting one dog with the other and fixed stops on the carriage arranged in front of and behind said dogs to limit the movements thereof.

2. The combination, with a sawmill-carriage having lateral movement on its axles; of the fixed central rail in the line of travel of the carriage, the pivoted dogs arranged on opposite sides of said center rail in working relation to the vertical sides thereof, a coiled spring connecting the said dogs together, and the fixed stops on the carriage-frame in front of and behind the said dogs to limit the throw thereof.

3. In an automatic offset for sawmill-carriages the combination, with the pivoted dogs arranged for operation on opposite sides of a fixed center rail and having curved ends to engage the said rail, one side of each dog being longer than the other side; of the yielding rollers mounted on spring-arms on the sides of the dogs for operation as set forth.

In testimony that I claim the foregoing I have hereunto set my hand and seal.

WILLIAM B. HEYWOOD. [L. S.]

Witnesses:
　CHAS. E. KELLY,
　G. E. KELLY.